United States Patent [19]

Dickey

[11] Patent Number: 4,541,237
[45] Date of Patent: Sep. 17, 1985

[54] SUB-IDLE SPEED CONTROL APPARATUS FOR AN AIRPLANE TURBINE ENGINE

[75] Inventor: Thomas A. Dickey, Westport, Conn.

[73] Assignee: Avco Corporation, Stratford, Conn.

[21] Appl. No.: 542,631

[22] Filed: Oct. 17, 1983

[51] Int. Cl.[4] ............................................. F02C 9/28
[52] U.S. Cl. ................................................. 60/39.281
[58] Field of Search ..................................... 60/39.281

[56] References Cited

U.S. PATENT DOCUMENTS

| | | | |
|---|---|---|---|
| 4,424,666 | 1/1984 | Woody | 60/39.281 |
| 4,444,008 | 4/1984 | Cantwell | 60/39.281 |

Primary Examiner—Louis J. Casaregola
Attorney, Agent, or Firm—Ralph D. Gelling

[57] ABSTRACT

A sub-idle speed control apparatus for reducing the thrust of an airplane turbine engine is provided. The subject invention reduces the compressor discharge pressure measured by an existing pressure sensing means which proportionally reduces the fuel flow to the engine. Hence, the engine speed is reduced resulting in a lower engine thrust. A switch activates the apparatus which closes a normally open valve in the existing pressure line between the compressor and the pressure sensing means and diverts the pressure through a by-pass line having a restrictor. The by-pass line is connected to the existing pressure line on the compressor side and the pressure sensing side of the normally open valve. A normally closed valve and a spring loaded valve respectively are connected to the existing pressure line and the by-pass line at the connection point nearest the pressure sensing means. When the apparatus is activated the normally closed valve is opened simultaneously with the closing of the normally open valve. The spring loaded valve maintains the flow of pressure through the restrictor which acts to reduce the pressure flowing through the restrictor and thus reducing the pressure measured by the pressure sensing means.

7 Claims, 4 Drawing Figures

SUB-IDLE SPEED CONTROL APPARATUS FOR AN AIRPLANE TURBINE ENGINE

BACKGROUND OF THE INVENTION

The turbine engine of an airplane runs at ground idle speed while the aircraft is taxiing into an airport station or taxiing out to the runway in preparation for take-off. Ground idle is a throttle position which maintains a moderately low thrust at which the engine may be operated suitable for specific ground conditions. Taxiing with the engine operating at ground idle thrust, however, should be kept to a minimum since the engine thrust is sufficiently high to cause the brakes to wear relatively fast. In addition, fuel consumption while taxiing at ground idle is also relatively high. Furthermore, the ground idle thrust may cause the aircraft to be difficult to control on slippery runways coated with ice or snow.

A thrust reverser mechanism may be incorporated in the engine to help reduce the thrust of an airplane turbine engine to solve the above mentioned problem. However, a thrust reverser mechanism would have to be generally controlled by a separate set of control throttles which would mean more equipment in the pilot's already crowded cockpit. In addition to the fact that the pilot would be forced to become familiar with still another set of complicated controls, when the thrust reverser mechanism is utilized at the low ground idle speed, there may be a tendency for exhaust gases to reenter the air inlet which could result in compressor surge and an excessive exhaust gas temperature.

Alternatively, the existing throttle could be modified to include another position corresponding to a lower thrust. This arrangement would entail further complicating the throttle. More particularly, safety precautions would require another detent added to the throttle to prevent the pilot from moving into the lower thrust position too soon, and thus losing power unnecessarily.

Accordingly, there is a need for a safe and efficient apparatus for reducing the thrust of the turbine engine of an airplane while the airplane is taxiing.

In view of the above it is an object of the subject invention to provide a sub-idle speed control apparatus for reducing the thrust of a turbine engine of an airplane while the airplane is taxiing to reduce brake wear and mimimize fuel consumption.

It is another object of the subject invention to provide a sub-idle speed control apparatus for reducing the thrust of a turbine engine of an airplane that is separate and distinct from the throttle.

It is a further object of the subject invention to provide a sub-idle speed control apparatus for reducing the thrust of a turbine engine of an airplane that enables the pilot to select a lower engine speed while at ground idle.

It is an additional object of the subject invention to provide a sub-idle speed control apparatus for reducing the thrust of a turbine engine of an airplane that can only be activated while the airplane is on the ground.

SUMMARY OF THE INVENTION

The subject invention provides a sub-idle speed control apparatus for reducing the thrust of an airplane turbine engine. Utilizing the subject invention, the pilot is permitted to select a sub-idle speed while the aircraft is taxiing, thereby lowering the thrust of the engine. More particularly, an airplane turbine engine has a compressor and a fuel control system with the amount of fuel supplied to the engine by the fuel control system being a function of several parameters: compressor speed; air temperature entering the engine; compressor discharge pressure ($P_3$); and the throttle angle. The fuel flow is directly proportional to $P_3$; hence, a reduction in $P_3$ of 50% will reduce the fuel flow by 50%. A pressure sensing means incorporated in the fuel control system measures the amount of $P_3$ through a pressure line between the compressor and the pressure sensing means. The subject invention reduces the amount of $P_3$ sensed by the pressure sensing means.

Specifically, the sub-idle speed control apparatus made according to the subject invention includes a normally open valve intermediate the existing pressure line. A means to drop the $P_3$ to a lower value consisting of a multi-orifice restrictor is in a separate by-pass line connected to the existing pressure line between the compressor and the normally open valve and also between the normally open valve and the pressure sensing means. A normally closed valve is disposed intermediate an extension line which is connected to the point where the by-pass line connects with the existing pressure line adjacent the pressure sensing means. A spring loaded valve is employed at the opposite end of the extension line to maintain $P_3$ steady at the lower value. The free end of the spring loaded valve extends outboard the airplane to release excess air pressure. The normally open and normally closed valves act in conjunction to divert $P_3$ through the restrictor before $P_3$ is measured by the pressure sensing means.

In normal operation of the engine, the spring loaded valve will be closed. The subject sub-idle speed control apparatus is activated by a switch in the cockpit totally independent of the throttle. When the aircraft is taxiing, the pilot activates the switch to transfer the engine into sub-idle operation, in which, the normally open switch closes and the normally closed switch opens, thus diverting $P_3$ through the multi-orifice restrictor. The amount of pressure drop across the restrictor is determined by the spring loaded valve which is opened and modulating to keep the pressure drop constant. The pressure drop causes the fuel control pressure sensing means to sense a lower amount of $P_3$. A fail safe mechanism is included in the subject apparatus to prevent the cockpit switch from activating the apparatus unless the wheels of the aircraft are on the ground. Thus the lower $P_3$ translates into proportionally less fuel flow going to the engine thus causing the engine speed to be lowered and thereby reducing the thrust of the engine.

Under normal conditions the reduction in speed would cause a fly ball governor to become operational. The function of this constant speed device is to keep the engine running at ground idle speed. However, the subject sub-idle speed control apparatus prevents the fly ball governor from raising the speed of the engine. The fly ball governor is automatically deactivated upon shifting of the engine into sub-idle operation. Therefore, since the engine speed is only controlled by the fuel control system, the lower fuel flow to the engine caused by the drop in $P_3$ will reduce the engine speed sufficiently to reduce the thrust and result in less brake wear and lower fuel consumption while the airplane is taxiing.

DETAILED DESCRIPTION OF THE PREFERRED EMBODIMENTS

Figure 1:
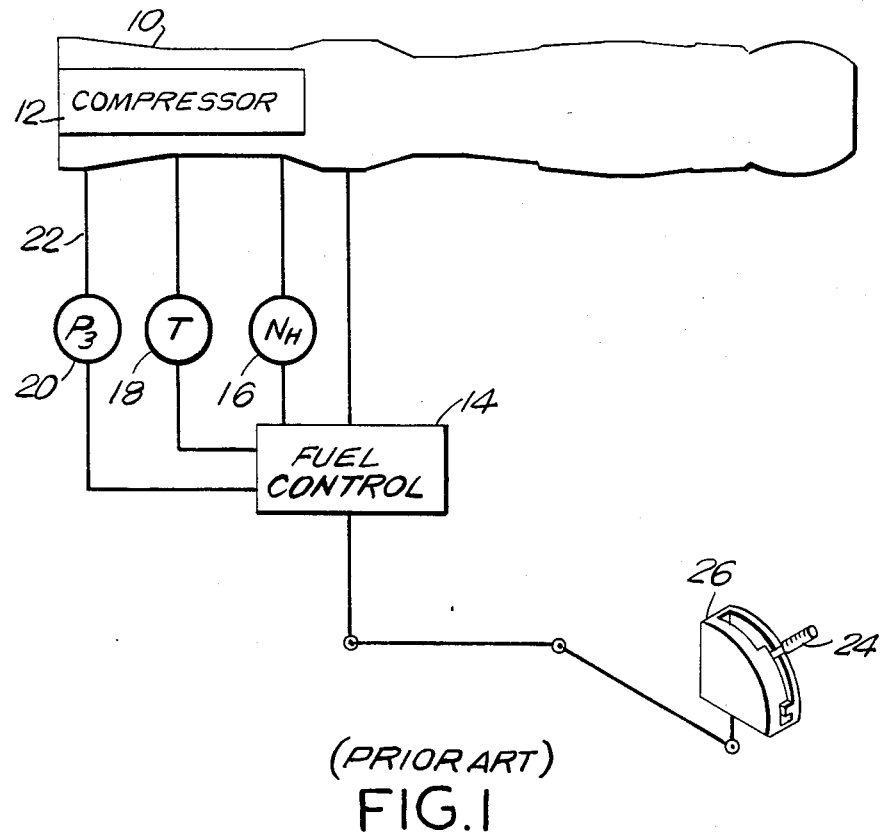
FIG. 1 is a schematic diagram of a prior art airplane turbine engine fuel control system.

Referring to FIG. 1, a prior art fuel control system embodied in an engine 10 extends between compressor 12 and a fuel control 14. As noted above, the amount of fuel flow to the engine is a function of four parameters: compressor speed ($N_H$) which is measured by a speed sensing means 16; air temperature entering the engine (T) which is measured by temperature sensing means 18; compressor discharge pressure ($P_3$) which is measured by pressure sensing means 20 through fluid pressure line 22; and the position of throttle lever 24 of throttle control 26. In order to taxi the airplane in the airport, the pilot selects the lowest throttle position, which causes the airplane engine speed to run at ground idle. During taxiing, the thrust of the aircraft at ground idle speed is higher than what is actually needed, thus causing rapid brake wear and fuel consumption. To reduce the thrust, the amount of fuel supplied by the fuel control 14 must be reduced, which will reduce the engine speed. The throttle 26 already being at the lowest position, one of the other factors that controls the fuel flow must be reduced. The compressor speed $N_H$ at ground idle is also at its minimum level of 50% $N_H$, which is required to run the alternator to supply electrical power to the aircraft for support functions while the aircraft is on the ground. However, if an auxiliary power unit is utilized to supply the necessary electrical power, the compressor speed can be reduced. Alternatively, in a multi-engine airplane, the compressor speed can be reduced in less than all the engines. Thus, if an apparatus could be supplied to reduce the compressor speed, the engine thrust would be significantly reduced.

Figure 2:
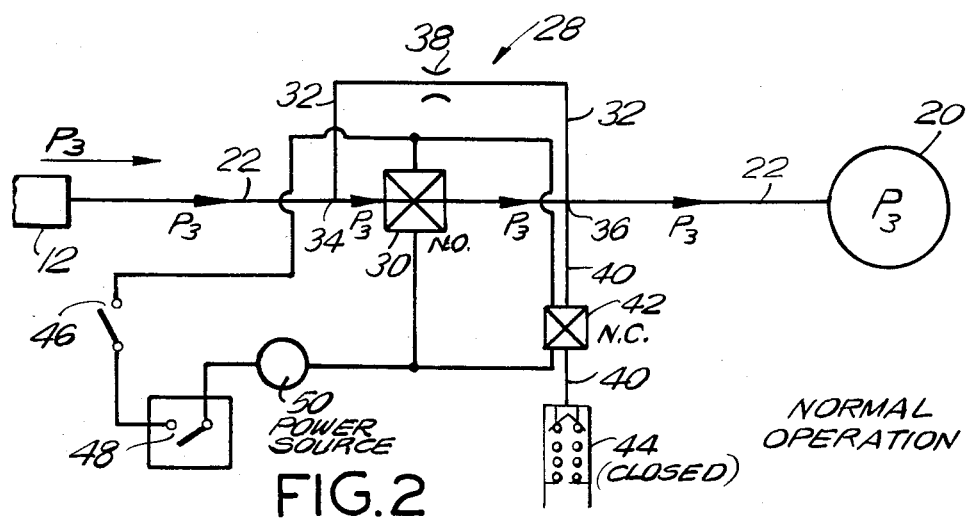
FIG. 2 is a schematic diagram of the sub-idle speed control apparatus of the subject invention after activation at which time the pressure flow $P_3$ is diverted through the restrictor.

Accordingly, sub-idle speed control apparatus 28, as shown in FIG. 2, is provided which reduces the amount of $P_3$ sensed by pressure sensing means 20 thus reducing the amount of fuel flow supplied by fuel control 14 thereby lowering the compressor speed and producing a lower engine thrust. Referring now to FIG. 2 sub-idle speed control apparatus 28 includes normally open valve 30 intermediate fluid pressure line 22 extending between compressor 12 and pressure sensing means 20. When the turbine engine 10 is operational, compressor 12 will discharge a pressure indicated by arrows $P_3$ through fluid pressure line 22. In the condition of the sub-idle speed control apparatus 28 as shown in FIG. 2, the sub-idle apparatus 28 is deactivated and the aircraft engine operates under normal conditions. At normal operation, the normally open valve 30 is in the open position and pressure $P_3$ flows through fluid pressure line 22 directly to pressure sensing means 20 as indicated by the arrows $P_3$ in FIG. 2. Hence the actual level of $P_3$ is sensed by pressure sensing means 20 and therefore fuel control 14 supplies the amount of fuel to the engine corresponding to the actual $P_3$ pressure.

A by-pass line 32 is connected to fluid pressure line 22 at location 34 between compressor 12 and normally open valve 30 and at location 36 between normally open valve 30 and pressure sensing means 20. Restrictor means 38 is disposed intermediate by-pass line 32. Preferably, restrictor means 38 is a multi-orifice restrictor which acts to drop the pressure flowing through the orifices when the sub-idle speed control apparatus is operational. Extension line 40 is connected to the by-pass line 32 and fluid pressure line 22 at location 36. A normally closed valve 42 is disposed intermediate extension line 40. Normally closed valve 42 is in the closed position when the sub-idle apparatus is not in operation and hence prevents pressure $P_3$ from flowing through by-pass line 32. Spring loaded valve 44 is connected to the free end of extension line 40 for maintaining a steady pressure drop across the restrictor means 38. One end of spring loaded valve 44 extends outboard the airplane for releasing excess air pressure. At normal operation, spring loaded valve 44 is in a closed position, as shown in FIG. 2.

Figure 3:
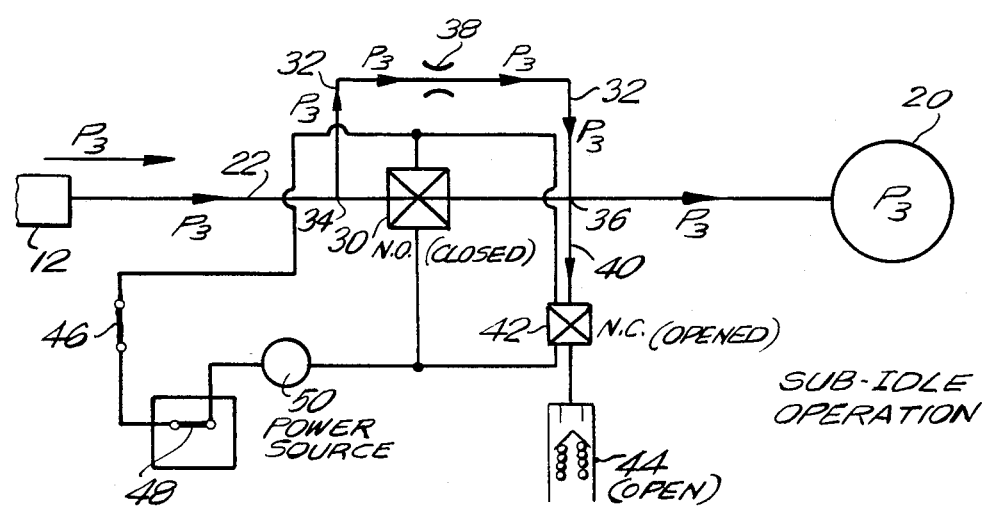
FIG. 3 is a schematic diagram of the sub-idle apparatus of the subject invention after activation at which time the pressure flow $P_3$ is diverted through the restrictor.

The sub-idle speed control apparatus 28 is activated only when the throttle lever 24 is at ground idle speed position, the lowest engine speed position on the throttle control 26. To activate the apparatus to the condition as illustrated in FIG. 3, switch 46 is actuated by the pilot thereby activating normally open valve 30 to the closed position and normally closed valve 42 to the open position. In addition, pressure switch 48 is connected between switch 46 and power source 50 to prevent the sub-idle speed apparatus from being activated unless the wheels of the aircraft are on the ground. The valves 30 and 42 are electrically connected in parallel such that when the switch 46 is actuated, normally open valve 30 will close and normally closed valve 42 will open simultaneously. Thus, pressure $P_3$ is now diverted through by-pass line 32, as shown in FIG. 3, before $P_3$ terminates at pressure sensing means 20. However, if switch 46 is actuated by the pilot while the engine is running at the higher take off speed and therefore at a corresponding higher $P_3$, valve 30 will not close because valve 30 is constructed in such a manner so that it cannot close at the higher take-off level of $P_3$.

Figure 4:
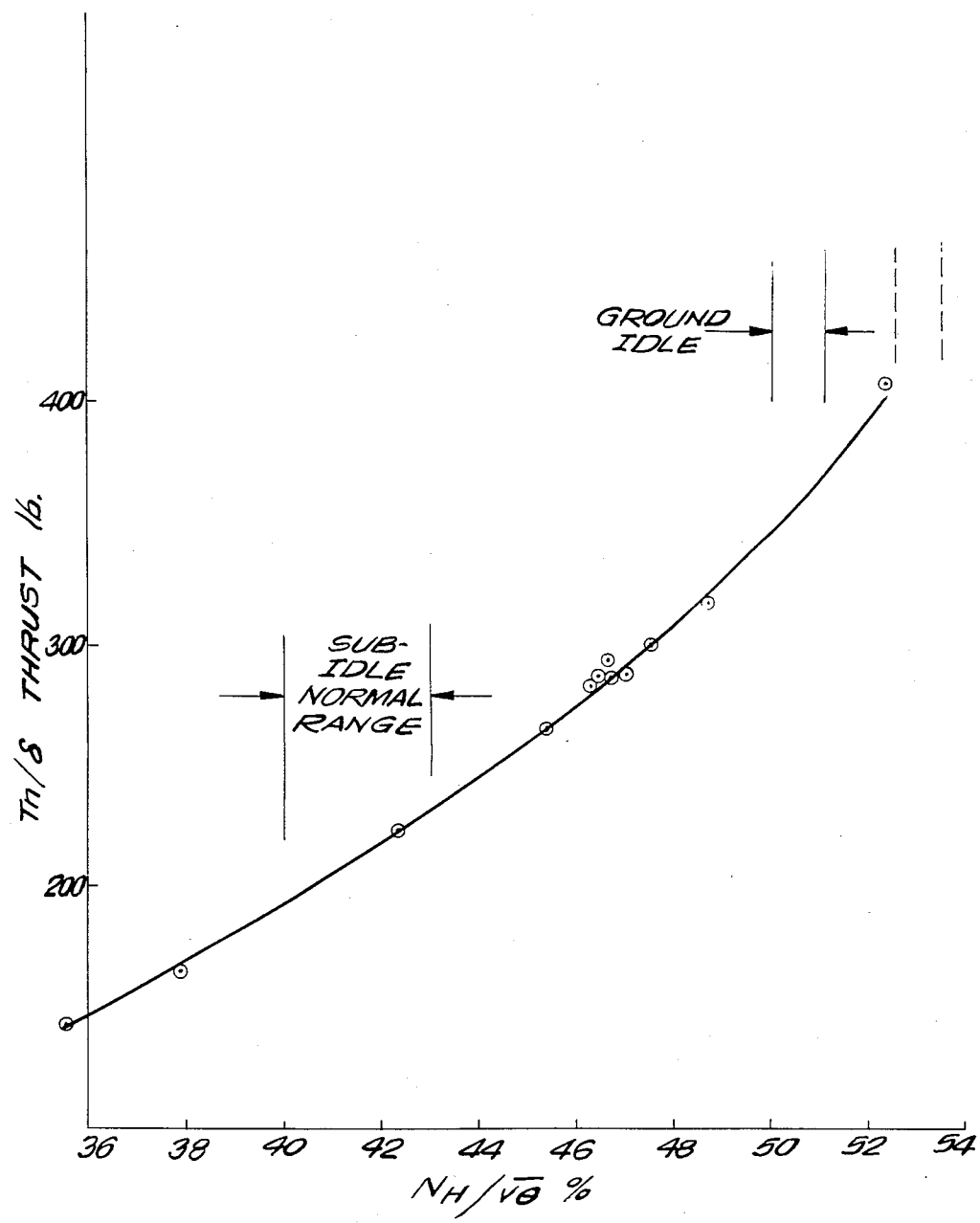
FIG. 4 is a graph showing the difference in engine thrust at a ground idle setting and at a sub-idle setting utilizing the subject invention.

Restrictor means 38 acts to drop the pressure flowing therethrough. The amount of the pressure drop across restrictor means 38 is controlled by spring loaded valve 44. More particularly, spring loaded valve 44 will be opened and modulating as shown in FIG. 3 to keep a constant pressure above atmospheric at pressure sensing means 20. Typically, $P_3$ at ground idle speed is approximately 40 psi. Spring loaded valve 44 modulates to maintain the pressure at pressure sensing means 20 at approximately 3 psi above ambient pressure, or at approximately 18 psi. Therefore, because $P_3$ sensed by the pressure sensing means is approximately 18 psi, the fuel control 14 will decrease the amount of fuel flow to the turbine engine 10 proportional to the decrease in $P_3$. Thus the speed of the turbine engine is slowed to the new sub-idle speed thereby reducing the thrust. As indicated in FIG. 4, the compressor speed $N_H$ at ground idle is between 49% and 51% and the engine thrust is in the range of 340–380 lbs. However, when the sub-idle speed control apparatus 28 is activated the compressor speed $N_H$ is reduced to between 40% and 43% and the engine thrust is reduced to a range from 180–240 lbs. This reduction in thrust will result in significantly less brake wear and fuel consumption.

Prior to activating the sub-idle speed control apparatus 28 the throttle lever 24 is at the lowest position which is ground idle engine speed. Anytime the engine speed is below the speed the throttle lever is calling for, a fly ball governor (not shown) will operate to keep the engine speed at the proper level. When the sub-idle speed control apparatus 28 is activated the engine speed is reduced and therefore, the fly ball governor attempts to increase the engine speed to ground idle speed. However, because the engine is under fueled due to lower $P_3$ the fly ball governor is automatically unable to control the engine speed. Thus the subject invention permits the engine speed to be controlled entirely by the fuel control system which therefore allows the engine to be lower than what the throttle lever 24 is calling for.

In summary, the subject invention provides a sub-idle speed control apparatus for reducing the thrust of an airplane turbine engine. More particularly, the sub-idle speed control apparatus includes a normally open valve intermediate the existing pressure line extending between the compressor and pressure sensing means of the turbine engine. A by-pass line is in communication with the existing pressure line on both sides of the normally open valve. Intermediate the by-pass line is a restrictor means which reduces the amount of pressure that passes through the restrictor. A normally closed valve is connected to the existing pressure line between the normally open valve and the pressure sensing means at the point which connects with the by-pass line. A spring loaded check valve is in communication with the normally closed valve. The sub-idle apparatus is activated by a switch in the cockpit which electrically closes the normally open valve and opens the normally closed valve. Thus the pressure is diverted from the existing pressure line, through the restrictor in the by-pass line, back to the existing pressure line and then to the pressure sensing means. The spring loaded check valve maintains a pressure drop across the restrictor at approximately 3 psi above ambient which is the pressure measured by the pressure sensing means. Since the fuel flow to the engine is directly proportional to the amount of pressure, the subject invention produces a lower fuel flow which reduces the engine speed resulting in a lower thrust.

While a preferred embodiment of the subject invention has been described and illustrated, it is obvious that various changes and modifications can be made therein without departing from the spirit of the present invention which should be limited only by the scope of the appended claims.

What is claimed is:

1. A sub-idle speed control apparatus for reducing the thrust of a turbine engine of an airplane, said engine including a compressor, a pressure sensing means in communication with said compressor through a fluid pressure line for sensing the compressor discharge pressure, and a fuel control system in communication with said pressure sensing means for supplying fuel to the engine in proportion to the compressor discharge pressure, said sub-idle speed control apparatus comprising:

a normally open valve means intermediate said fluid pressure line;

a by-pass line in communication with said fluid pressure line intermediate said normally open valve means and said compressor, and intermediate said normally open valve means and said pressure sensing means;

a restrictor means intermediate said by-pass line for reducing the amount of compressor discharge pressure sensed by the pressure sensing means;

a normally closed valve means in communication with the point of communication between the by-pass line and the fluid pressure line intermediate said normally open valve and said pressure sensing means;

a spring loaded valve means in communication with said normally closed valve means for maintaining the reduced amount of compressor discharge pressure; and an activating means operative during the time the airplane is on the ground, for closing said normally open valve means and opening said normally closed valve means so as to divert said compressor discharge pressure through said by-pass line and said restrictor means, thus causing the pressure sensing means to sense a reduced amount of compressor discharge pressure which causes the fuel control system to supply proportionally less fuel to the engine thereby reducing said engine speed and thus reducing said thrust.

2. A sub-idle speed control apparatus as in claim 1 wherein said activating means comprises a pilot activated electrical switch which provides power to said normally open valve means and normally closed valve means which are electrically connected in parallel.

3. A sub-idle speed control apparatus as in claim 1 wherein said activating means is electrically connected to the ground wheels of said airplane whereby said activating means is prevented from opening and closing said valve means unless the ground wheels are actually on the ground.

4. A sub-idle speed control apparatus as in claim 1, wherein said restrictor means is a multi-orifice restrictor.

5. A sub-idle speed control apparatus as in claim 1 wherein the reduced amount of compressor discharge pressure is approximately 18 psi.

6. A sub-idle speed control apparatus as in claim 1 wherein the thrust is reduced from the range of 340–380 lbs.

7. A sub-idle speed control apparatus for reducing the thrust of a turbine engine of an airplane, said engine including a compressor, a pressure sensing means in communication with said compressor through a fluid pressure line for sensing the compressor discharge pressure, and a fuel control system in communication with said pressure sensing means for supplying fuel to the engine in proportion to the compressor discharge pressure, said sub-idle speed control apparatus comprising:

a normally open valve means intermediate said fluid pressure line;

a by-pass line in communication with said fluid pressure line at a first connection point intermediate said normally open valve means and said compressor, and at a second connection point intermediate said normally open valve means and said pressure sensing means;

a restrictor means intermediate said by-pass line for reducing the amount of compressor discharge pressure sensed by the pressure sensing means;

an extension line in communication with said fluid pressure line and said by-pass line at said second connection point, said extension line having one end extending outboard the airplane;

a normally closed valve means intermediate said extension line;

a spring loaded valve means in communication with the outboard end of said extension line; and an activating means operative during the time the airplane is on the ground, for closing said normally open valve means and opening said normally closed valve means thereby diverting said compressor discharge pressure through said by-pass line and said restrictor means thereby causing the pressure sensing means to sense a reduced amount of compressor discharge pressure which causes the fuel control system to supply proportionally less fuel to the engine thereby reducing said engine speed and thus reducing said thrust.

* * * * *